(12) United States Patent
Schulz et al.

(10) Patent No.: US 11,958,009 B2
(45) Date of Patent: Apr. 16, 2024

(54) FILTER DEVICE, AIR CONDUCTING HOSE WITH FILTER ELEMENT, TUNNEL, AND USE OF THE FILTER DEVICE

(71) Applicant: MANN+HUMMEL GmbH, Ludwigsburg (DE)

(72) Inventors: Christoph Schulz, Stuttgart (DE); Tobias Warth, Winnenden (DE); Marc Hittinger, Reutlingen (DE); Jens Gusek, Freudental (DE); Maximilian Bauch, Boennigheim (DE); Thilo Mueller, Karlsruhe (DE); Anja Koronai-Bauer, Ludwigsburg (DE); Sylvain Michel Tchale, Karlsruhe (DE); Roman Eder, Ludwigsburg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 401 days.

(21) Appl. No.: 17/188,677

(22) Filed: Mar. 1, 2021

(65) Prior Publication Data
US 2021/0275953 A1    Sep. 9, 2021

(30) Foreign Application Priority Data
Mar. 4, 2020   (DE) ..................... 10 2020 105 750.4

(51) Int. Cl.
*B01D 46/00* (2022.01)
*B01D 46/52* (2006.01)
*B01D 46/58* (2022.01)

(52) U.S. Cl.
CPC ......... *B01D 46/58* (2022.01); *B01D 46/0005* (2013.01); *B01D 46/0036* (2013.01);
(Continued)

(58) Field of Classification Search
CPC ................ B01D 46/58; B01D 46/0005; B01D 46/0036; B01D 46/0041; B01D 46/521;
(Continued)

(56) References Cited

U.S. PATENT DOCUMENTS 5,312,465 A * 5/1994 Riutta ................ B01D 46/0049
55/471
2003/0089092 A1 * 5/2003 Bause .................. B01D 39/163
96/154
(Continued)

FOREIGN PATENT DOCUMENTS

DE          20211827 U1    10/2002

*Primary Examiner* — Robert A Hopkins
*Assistant Examiner* — Qianping He

(57) ABSTRACT

A filter device for ambient air filtration has a blower housing with air inlet and air outlet. A device for generating an air flow is arranged in the blower housing and generates an air flow in operation from air inlet to air outlet. A flexible air conducting hose is provided with a first open end connected to the air outlet of the blower housing and with a second closed end. The flexible air conducting hose has openings arranged between first open end and second closed end. Filter elements are arranged in the openings, respectively. The filter elements separate a raw side inside the air conducting hose from a clean side downstream of the filter element. The air conducting hose is inflated in operation of the device by the air flow. The flexible air conducting hose has a reduced air permeability compared to the air permeability of the filter elements.

26 Claims, 10 Drawing Sheets

(52) U.S. Cl.
CPC ....... *B01D 46/0041* (2013.01); *B01D 46/521* (2013.01); *B01D 2253/102* (2013.01); *B01D 2253/108* (2013.01); *B01D 2265/022* (2013.01); *B01D 2265/05* (2013.01); *B01D 2273/30* (2013.01); *B01D 2279/40* (2013.01)

(58) Field of Classification Search
CPC ........ B01D 2253/108; B01D 2253/102; B01D 2265/022; B01D 2265/05; B01D 2273/30; B01D 2279/40; B01D 29/27; B01D 29/41; B01D 2279/10; B01D 46/00; B01D 46/52; G09F 19/08; A63H 3/06
USPC ......................................................... 55/484
See application file for complete search history.

(56) References Cited

U.S. PATENT DOCUMENTS

| | | | | |
|---|---|---|---|---|
| 2003/0187082 | A1* | 10/2003 | Scherba | E04H 15/20 |
| | | | | 521/30 |
| 2005/0182372 | A1* | 8/2005 | Huza | A61F 13/15699 |
| | | | | 604/359 |
| 2006/0053873 | A1* | 3/2006 | Ganassi | G01M 17/007 |
| | | | | 73/118.01 |
| 2020/0352051 | A1* | 11/2020 | He | F04D 29/4246 |

\* cited by examiner

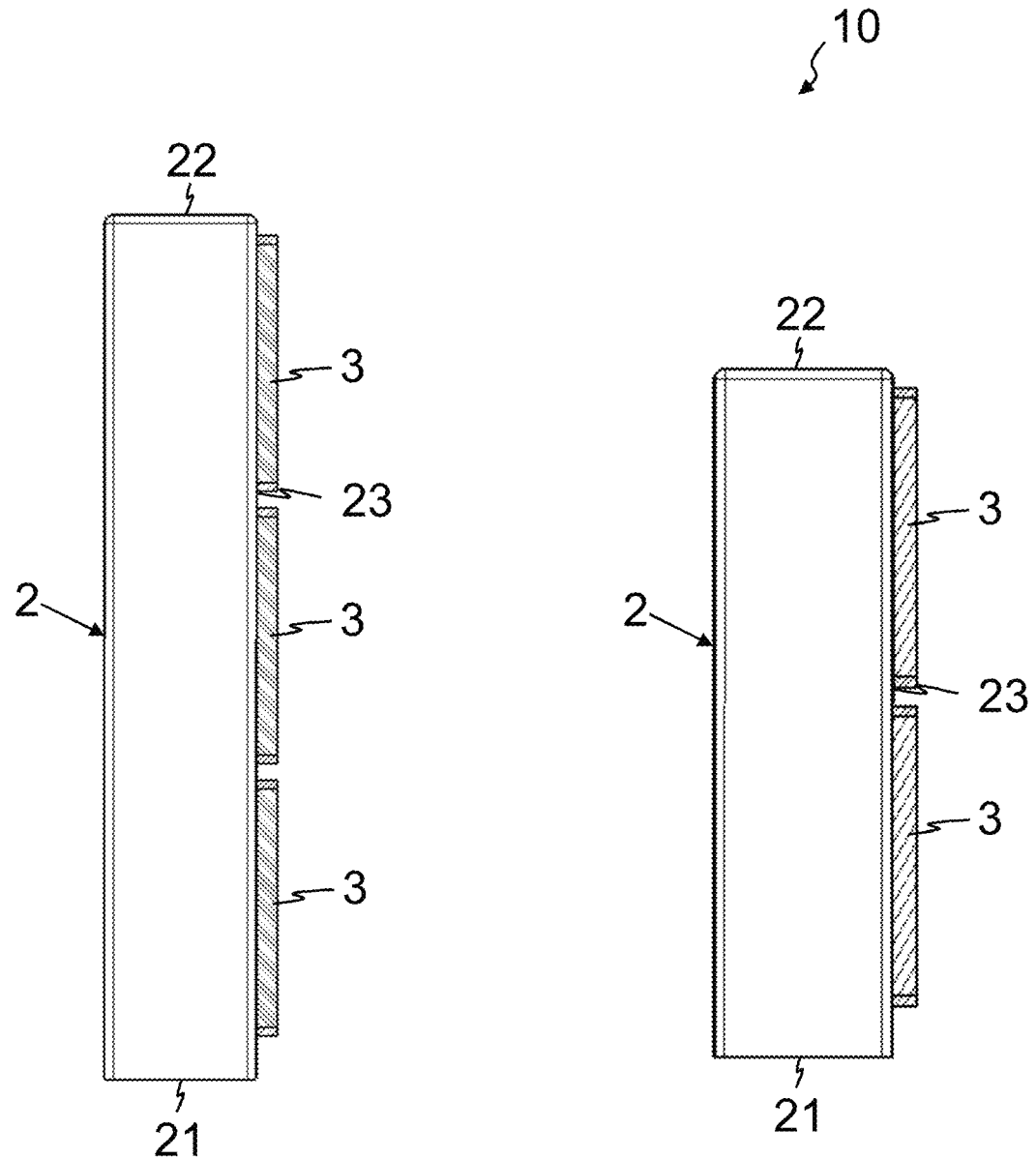

FILTER DEVICE, AIR CONDUCTING HOSE WITH FILTER ELEMENT, TUNNEL, AND USE OF THE FILTER DEVICE

TECHNICAL FIELD

The invention concerns a filter device, in particular for stationary ambient air filtration, an air conducting hose with filter element, a tunnel, in particular vehicle or pedestrian tunnel, as well as a use of the filter device.

BACKGROUND OF THE INVENTION

Worldwide, in many metropolitan areas there is the problem that the ambient air can surpass many times over the limit values for particulate matter and/or gases such as ozone, NOR, CO that are due to industrial exhaust gases, traffic, and private fireplaces, primarily in adverse weather conditions (no rain, inversion, minimal wind speed, no air exchange between altitude layers). Measures that lead to a reduction of the pollutant concentrations can reside either in avoiding or reducing emissions and/or separation of these pollutants from the ambient air.

A concept that is already documented in the prior art is the use of stationarily mounted ambient air purifiers for separation of airborne pollutants. Such devices comprise in general a housing that can be flowed through, provided with an inlet and an outlet in which one or a plurality of blowers and a filter are arranged, wherein the filters can be conventional filter elements of porous, air-permeable filter media and/or electrostatic separators. The ambient air purifiers are installed advantageously at locations with increased pollutant concentration, for example, in outdoor spaces as well as in indoor spaces, tunnels, subterranean train stations, bus stations etc.

Such ambient air purifiers are disclosed, for example, in DE 20 2016 102 373 U1 in the form of an advertisement column or in FR 27 87 175 A.

The ambient air purifiers disclosed therein have however the disadvantage that they are heavy and inflexible and suitable only to a limited extent for a use in complex, in particular curved and/or ragged, installation spaces.

SUMMARY OF THE INVENTION

Based on the above background art, it is the object of the invention to provide a filter device that is characterized by a simpler, more flexible construction as well as a good adaptability to complex, in particular curved and/or ragged, installation spaces.

Moreover, the object is to provide an air conducting hose with filter element by means of which servicing of the filter device according to the invention can be carried out particularly easily and cleanly.

Finally, the object is to provide a solution for filtration of ambient air in a tunnel which is characterized by a particularly good installation space utilization.

This object is solved in regard to the filter device in that the filter device comprises at least one flexible air conducting hose, wherein the air conducting hose has a first open end that is connected to the air outlet of the blower housing and has a second closed end, wherein in the air conducting hose between the first and the second end at least one opening is present at which at least one filter element is arranged, wherein the filter element separates a raw side inside the air conducting hose from a clean side arranged downstream of the filter element, wherein the air conducting hose is inflatable in an operating state by means of the device for producing the air flow and comprises a reduced air permeability in comparison to the at least one filter element.

This object is further solved in regard to an air conducting hose with filter element in that the air conducting hose is embodied flexibly and has a first open end that is connectable to the air outlet of the blower housing of the filter device and has a second closed end, wherein, in the air conducting hose between the first and the second end, at least one opening is present at which at least one filter element is arranged, wherein the air conducting hose comprises a reduced air permeability in comparison to the at least one filter element.

This object is solved in regard to the tunnel, in particular vehicle tunnel, in particular rail vehicle tunnel, or pedestrian tunnel, in that the tunnel comprises a tunnel floor, a tunnel ceiling, and at least one tunnel wall, wherein in particular the tunnel wall has a curved cross section shape, wherein at or in the at least one in particular curved tunnel wall a filter device according to the invention is arranged.

The object is further solved by use of the filter device according to the invention for ambient air filtration in a tunnel, in particular a tunnel as described above.

Preferred further embodiments are disclosed by the respective dependent claims.

The filter device according to the invention is provided in particular for stationary ambient air filtration and comprises a blower housing that comprises at least one air inlet and at least one air outlet. In the blower housing, at least one device for generating an air flow is arranged by means of which an air flow from the air inlet to the air outlet can be generated. The filter device comprises at least one flexible air conducting hose that has a first open end as well as a second closed end. With the first open end, the air conducting hose is connected to the air outlet of the blower housing. In the air conducting hose, between the first and the second end, at least one opening is provided at which at least one filter element is arranged that separates a raw side inside of the air conducting hose from a clean side which is downstream of the filter element. The air conducting hose can be inflated in the operating state by means of the device for generating the air flow. According to one embodiment, the filter element can be inserted into the at least one opening.

According to the invention, the air conducting hose comprises a reduced air permeability in comparison to the at least one filter element. In this way, it is achieved that as little as possible unfiltered air escapes through the air conducting hose and the major portion of the air must pass through the filter elements for filtration.

In embodiments, the air conducting hose can be air-impermeable wherein the air conducting hose comprises in particular an air-impermeable material or is comprised thereof.

The configuration of the filter device according to the invention provides in comparison to known filter devices the advantage that it can be produced with a comparatively minimal material use because no massive components (in general of sheet steel) must be used for the air guiding action. The air guiding action is instead provided by the air conducting hose, which is light and flexible as well as inexpensive. This has the advantage that the device according to the invention can be adapted particularly well and flexibly to any installation spaces, simply by a corresponding design of the air conducting hose while the blower housing can be used in identical configuration for a plurality of different application situations. In particular, the filter device according to the invention can be used in curved and/or ragged installation spaces, for example, in or at curved wall structures and the like.

In a further embodiment, the at least one filter element can also be inserted detachably in the air conducting hose. For this purpose, in particular at least one detachable connecting means, preferably a hook-and-loop connection or a magnet connection can be used.

In still another embodiment, the air conducting hose, in the region of the at least one opening, can have a receiving frame that comprises a rim extending circumferentially about the opening and connected fixedly to the air conducting hose. The receiving frame can provide an insertion opening into which the at least one filter element can be inserted in a detachable manner so that in regard to this embodiment one can also say that the filter element is inserted indirectly into the at least one opening of the air conducting hose.

The blower housing can comprise, for example, a parallelepipedal, in particular cubic, configuration. However, it can also have a design deviating therefrom, for example, with a circular or elliptical base surface.

The filter device according to the invention is primarily provided to be installed in a public outdoor space, for example, at inner city pollutant hot spots, for example, in an immediate vicinity of a roadway, in particular in a tunnel.

In a preferred embodiment, the device according to the invention is installed in an operating state such that the blower housing is present in a mounting position located at the bottom in regard to gravity while the air conducting hose is substantially extending away therefrom opposite to the direction of gravity or at an angle thereto.

The fluidic system (interaction of the device for generating the air flow and of the at least one filter element) is configured in this context such that the device for generating the air flow can essentially inflate the air conducting hose in the operating state so that the latter assume a defined shape by the inner pressure loading. The air conducting hose is therefore designed preferably to be stable with respect to inner pressure.

The air conducting hose can be produced from a web-shaped and/or hose-shaped starting material by manufacturing methods that are known from the textile and/or plastics industry, such as sewing and/or welding.

Advantageously, the air conducting hose together with the at least one filter element represents the servicing component in case of an imminent filter element exchange. This provides the advantage that by release of only one connection (air conducting hose to air outlet of the blower housing) an exchange of the at least one filter element as well as of the air guiding structure is possible. Furthermore, clean servicing is ensured in this way; dirt and, as needed, filter cake that has collected on the at least filter element are enclosed safely in the interior of the air conducting hose and therefore cannot reach the environment.

According to a preferred embodiment, an inner cross-sectional area of the air conducting hose decreases from the first to the second end. In this way, it is possible to achieve an influence on the local flow resistance in a targeted fashion along a length extension of the air conducting hose; this provides advantages in particular in the herein described embodiments with more than one filter element because, in this way, a hydraulic adjustment with the goal of flow of identical volume through all filter elements becomes possible.

In order to be able to purify a significant quantity of air, the filter device should have a defined minimum size. In this context, the air conducting hose can comprise a length of at least 0.5 m, preferably at least 1.5 m, more strongly preferred at least 2.5 m. The cross-sectional area of the air conducting hose in its expanded (inflated) state, i.e., with the blower running, can amount to between $0.01\ m^2$ and $0.5\ m^2$, preferably between $0.15\ m^2$ and $0.35\ m^2$.

In a further embodiment, it can be provided that the at least one filter element is connected fluid-tightly, in particular welded, glued and/or pressed, to a rim region of the air conducting hose surrounding the opening. Other connecting techniques that appear suitable to a person of skill in the art are however not precluded; thus, the filter element, with a corresponding configuration, e.g., by providing a suitable collar, can also be sewn to the rim region.

According to a further embodiment, the blower housing can comprise at least one grid that at least partially spans across the air inlet and/or the air outlet. The grid provides a safety guard and retains coarse dirt that otherwise could damage the device for generating the air flow.

The device for generating the air flow can be an axial, diagonal or radial blower that can be driven by an electric motor. Other drive actions that appear suitable to a person of skill in the art are possible.

For operating the electric motor, the filter device can preferably comprise an electric connector. Preferably, the electric connector can be realized at a low voltage level. The filter device can however also comprise devices that enable a connection at a medium voltage level, for example, to a traction power network.

According to a particularly preferred embodiment, in the air conducting hose at least two openings are provided, preferably at least three openings, in which a filter element is inserted, respectively. The openings can be spaced apart in this context in a length direction of the air conducting hose and/or can be arranged oppositely positioned to each other. Combinations of the aforementioned embodiments are expressly possible also.

According to yet another embodiment, the filter device can comprise a support device that supports the air conducting hose at least partially along its length extension, in particular in a non-operating state of the filter device, i.e., when the device for generating the air flow does not generate an air flow. The support device is provided to maintain the air conducting hose in an at least partially expanded state in regard to its length extension and to prevent that it collapses; this is helpful when restarting the device and can increase the service life of the air conducting hose because kinks are avoided.

The support device can be an inner support frame or inner skeleton that extends inside of the air conducting hose and is connected at least in the region of the first end of the air conducting hose to the blower housing. The inner support frame can comprise, for example, light and highly elastic rods, for example, of fiber-reinforced plastic composite. Due to the minimal own weight of the air conducting hose, no stiff and heavy metal construction is required for this purpose. An inner skeleton of rods of fiber-reinforced plastic composite has in addition the advantage that, when installed in the open air, possibly occurring wind loads or the deformations caused by the wind loads of the air conducting hose will be absorbed without problem by the rods due to their high elasticity. The inner support frame can be supported in the manner of a tent pole at the inner side of the air conducting hose.

Alternatively or additionally, the support device can comprise an outer support frame which extends outside of the air conducting hose and surrounds it. In this context, the air conducting hose is preferably fastened at least at its second end to the outer support frame, for example, by means of a rope or wire. One could also say that the air conducting hose is suspended from the outer support frame. Expediently, the air conducting hose is fastened at additional positions of its length extension to the outer support frame. For fastening by ropes and/or wire, the air conducting hose can comprise one or a plurality of eyes which safely prevent tearing apart of the hose material due to the fastening action.

According to a particularly preferred embodiment, the support device can comprise along its length extension at least one joint which comprises at least one rotational degree of freedom. The at least one joint divides the support device into individual support device segments that are pivotable relative to each other. A pivot axis of the at least one joint or hinge extends in this context preferably normal to the length extension. According to an also preferred embodiment, the support device can comprise along its length extension more than one joint, for example, two, three, four or even more joints. In this context, it can also be provided that the pivot axes of individual joints are different. Preferred is however an embodiment according to which the pivot axes of all joints extend parallel. This embodiment enables, even for filter devices with the support frames, an adaptability to complex installation spaces that has been unknown in the prior art up to now.

According to a further embodiment, a support device segment of the outer support frame can at least partially accommodate the blower housing. The support device segment which at least partially accommodates the blower housing can advantageously function as a supporting base of the filter device and should be dimensioned with sufficient overhang for this purpose in order to reliably absorb tilting moments by own weights of the air conducting hose, of the filter elements, and of the support device as well as, as needed, wind and snow loads.

According to an additional further embodiment, the at least one filter element can comprise at least one folded bellows of a filter medium. The filter medium can comprise optionally at least one adsorber that serves for adsorption of predetermined pollutant gases, for example, NOR, CO, $NH_3$. The adsorber can be at least an active carbon and/or a zeolite. The adsorber can be in particular part of the filter medium and can be present therein as a fill in the form of one or several layer(s). Alternatively or additionally, the filter element can have a polygonal, in particular parallelepipedal, shape.

Alternatively or additionally, the filter element can comprise a main filter element and a prefilter element arranged upstream in the flow direction, in particular a nonwoven mat, wherein the main filter element is embodied in particular with at least a folded bellows of a filter medium. Alternatively or additionally, the filter element can be a filter element that corresponds at least to particle filter classification ePM10 75% according to ISO 16890. The filter element can be in particular a flat filter element whose minimum width and/or minimum length amounts to 100 mm, preferably 200 mm, even more preferred at least 300 mm. A fold height of the folded bellows can amount to at least 15 mm, preferably at least 25 mm, more preferred at least 35 mm.

According to a likewise preferred further embodiment, the blower housing can comprise at least two air outlets wherein an air conducting hose is connected to each of the air outlets. The air outlets can be present at sides of the blower housing that are facing away from each other so that a configuration is obtained according to which the air conducting hoses, originating at the blower housing, extend away from each other. Such an arrangement can be advantageous when the filter device according to the invention is to be installed in a ceiling region of a room or of a tunnel because two spatially separate regions can be supplied with fresh air with a common blower housing.

Moreover, it can be provided that the air conducting hose is connected by means of a detachable hose interface to the at least one air outlet opening of the blower housing. This facilitates servicing (exchange of the filter elements) because with one manipulation (detaching the hose interface) the air conducting hose as well as the filter elements (together with the air conducting hose) can be separated from the blower housing.

The hose interface can comprise in this context a first interface part at the blower housing and a second interface part at the first end of the air conducting hose wherein preferably the hose interface comprises at least one thread and/or bayonet connecting element. Alternatively or additionally, the corresponding first and second interface parts can also comprise a key-lock code which prevents installation of a wrong air conducting hose (e.g., wrong length, incorrect filtration parameters of the filter elements).

A particularly preferred further embodiment provides that the air conducting hose comprises a single-layer or multi-layer fabric and/or film material or is comprised thereof, that comprises a thickness in a range of 0.05 mm to 5 mm, preferably 0.1 mm to 2 mm. Such film materials provide a good compromise between own weight, wear resistance, and inner pressure stability. Particularly preferred materials are thermoplastic plastic materials such as polypropylene, polyethylene, polystyrene, polyamide, polyvinyl chloride, polyethylene terephthalate, polyoxymethylene.

Alternatively or additionally, the air conducting hose can comprise at least one inwardly positioned flow guiding structure which is preferably comprised of a single-layer or multilayer fabric and/or film material. Advantageously, due to the at least one inwardly positioned flow guiding structure at least two compartments within the air conducting hose are formed that are inwardly at least partially closed off relative to each other. In a similar manner as the herein described tapering of the air conducting hose toward its second end, a hydraulic adjustment can be achieved also by one or a plurality of flow guiding structure(s) in embodiments with a plurality of filter elements arranged neighboring each other in the direction of the length extension wherein for this purpose a flow cross section provided by the flow guiding structure(s) can be locally narrowed at the inner side in a targeted fashion. The flow guiding structure can be oriented normal to the length extension or can be positioned at a predetermined angle relative to the normal. In a simple and inexpensive manner, such flow guiding structures can be produced as sewn-in or welded-in intermediate walls of the air conducting hose.

According to yet another embodiment, at the blower housing an air conducting socket surrounding the at least one air outlet opening is provided which is extending along the length extension of the air conducting hose at least partially into the air conducting hose. Preferably, the air conducting socket tapers in a direction away from the blower housing. The air conducting socket provides the technical advantage that an outflow can be guided in a targeted fashion into the hose interior and the interface region of the connection of the air conducting hose to the blower housing is relieved of flow effects. A tapering, in particular conical, configuration of the air conducting socket has furthermore the advantage that it can be mostly prevented that dirt, which during the course of operation has deposited in a region surrounding the air outlet opening, drops during servicing into the air outlet socket and may damage the device for generating the air flow in the blower housing.

According to an advantageous further embodiment, the air conducting socket can be comprised of a single-layer or multilayer fabric and/or film material. The air conducting socket can be fastened to the blower housing or can be part of the air conducting hose so that it is also exchanged in case of servicing. Advantageously, the air conducting socket is however comprised of a material that has a greater inherent stiffness than a material of the air conducting hose so that it does not collapse even in the non-operating state and can provide its protective function.

A further aspect of the invention concerns an air conducting hose with at least one filter element for a filter device according to the invention, wherein the air conducting hose is designed flexible and comprises a first open end that is connectable to the air outlet of the blower housing of the filter device and comprises a second closed end. In the air conducting hose, between the first and the second end, at least one opening is provided into which at least one filter element is inserted.

According to the invention, the air conducting hose comprises a reduced air permeability in comparison to the at least one filter element.

In particular, the air conducting hose comprises at the first end an interface part of a hose interface, preferably at least one thread and/or bayonet connecting element, which comprises a predetermined key-lock code.

Finally, a last aspect of the invention concerns a tunnel, in particular vehicle tunnel, for example, rail vehicle tunnel, or pedestrian tunnel. The tunnel comprises a tunnel floor, a tunnel ceiling, and at least one tunnel wall, wherein the tunnel wall can comprise a curved cross section shape. At or in the at least one curved tunnel wall, a filter device according to the invention is arranged. Due to its flexible configuration and its excellent adaptability to complex, in particular curved, installation spaces, the filter device according to the invention is perfectly received in or at the curved tunnel wall. It can be integrated in particular into a hollow space between the tunnel support structure (building shell) and a tunnel cladding so that it does not project past the tunnel cladding and does not restrict the structural clearance of the tunnel.

The tunnel according to the invention comprises, compared to known tunnels without filter device, a significantly improved air quality which is an important aspect in particular in tunnels frequented by persons, for example, in tunnel train stations. Conventional tunnel train stations, in particular subway train stations, are often loaded with regard to air pollutants such as PM2.5 and/or PM5 and/or PM10 at levels that surpass many times over the respective limit values for outdoor air. This can be avoided with the tunnel according to the invention in a simple manner and quasi "invisibly".

A further aspect of the invention concerns a use of the filter device according to the invention for ambient air filtration in a tunnel.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to expedient further combinations.

FIG. 8 shows a longitudinal section view of an air conducting hose according to the invention according to a first embodiment.

FIG. 9 shows a longitudinal section view of an air conducting hose according to the invention according to a second embodiment.

DESCRIPTION OF PREFERRED EMBODIMENTS

Figure 1:
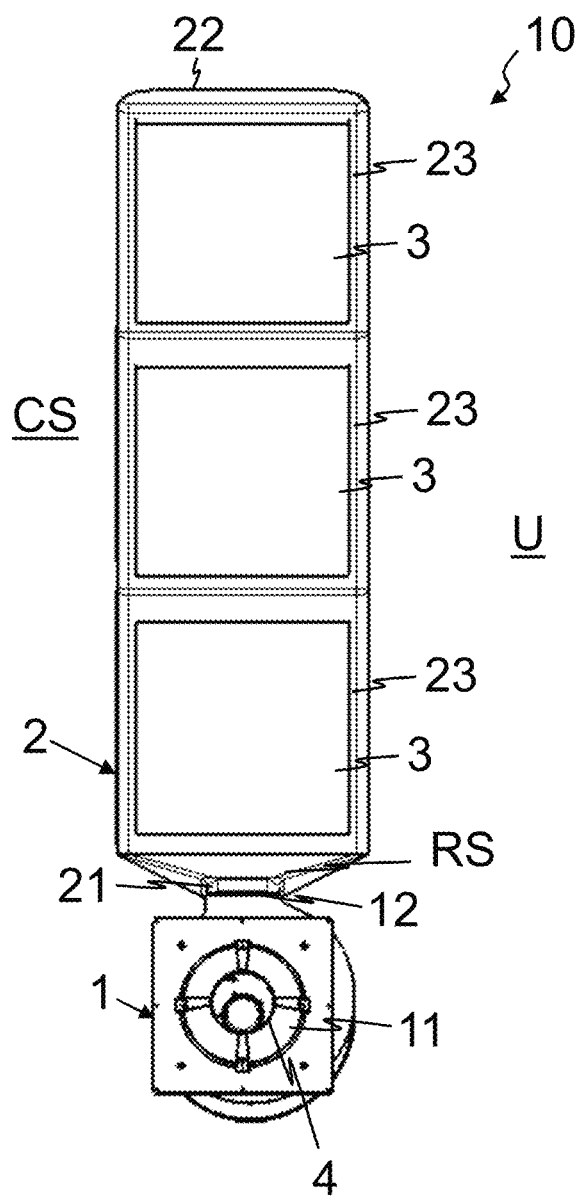
FIG. 1 shows a front view of the filter device according to the invention according to a first embodiment.

In the Figures, same or same type components are identified with same reference characters. The Figures show only examples and are not to be understood as limiting.

The filter device 10 according to the invention is illustrated in FIG. 1 in a front view in a first embodiment. It comprises a blower housing 1 that has an air inlet in the form of an air inlet opening 11 and an air outlet in the form of an outlet opening 12. Between the air inlet opening 11 and the air outlet opening 12, a flow path is formed in which, downstream of the air inlet opening 11 and upstream of the air outlet opening 12, a device 4 for generating an air flow is present, preferably a blower, in particular radial blower. The device 4 for generating an air flow sucks in air through the air inlet opening 11 in operation and blows it under pressure out of the air outlet opening 12. An air conducting hose 2 with its first open end 21 is fastened in fluid communication to a rim of the blower housing 1 surrounding the air outlet opening 12 or to an air outlet socket (not illustrated) so that air which is blown out of the air outlet opening 12 is guided into an interior of the air conducting hose 2. At a second end 22 of the air conducting hose 2 which is facing away from the first end 21, the air conducting hose 2 is of a closed configuration. The air conducting hose 2 is embodied of a flexible material, for example, a single-layer or multilayer film and/or fabric material, and can be inflated in an operating state by means of the blower 4. When the blower 4 is not operating, the air conducting hose 2 collapses due to its minimal own stiffness. Measures in order to avoid this collapse will be disclosed in connection with FIG. 3 $f\!f$ as well as in the general portion of the description as well as in the claims.

In the air conducting hose 2, three openings 23 are provided into which a filter element 3 is inserted, respectively. The filter elements 3 are each connected to a rim of the opening, i.e., connected to the material of the air conducting hose 2. The filter element 3 can be connected to the air conducting hose 2, for example, by gluing, welding, sewing. The filter elements 3 each have at least one filter medium that is configured to filter certain particles and/or pollutant gases out of the air. The filter medium can be present in particular folded to a folded bellows or in a flat shape. Also, a prefilter element can be provided that is arranged upstream of the (main) filter element in flow direction.

Figure 2A:
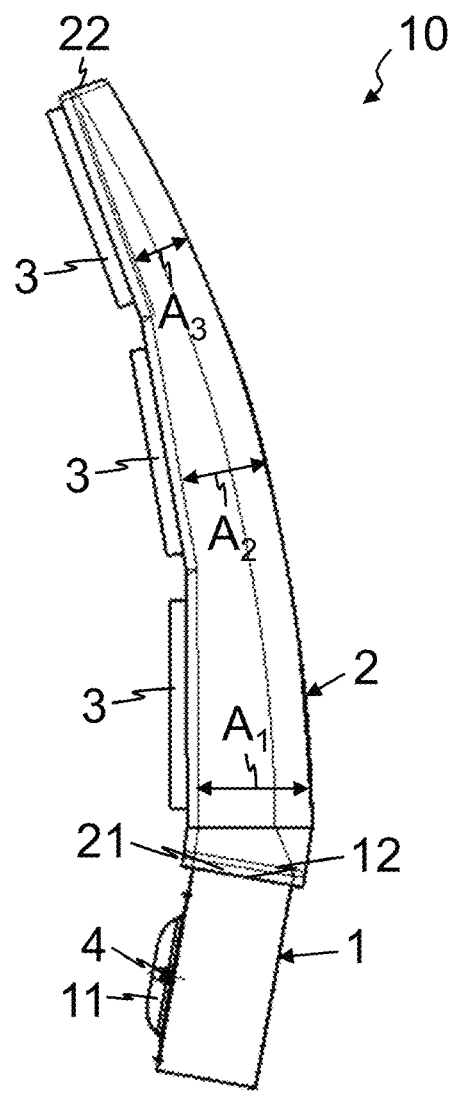
FIG. 2a shows a side view of the filter device according to the invention according to the first embodiment.

In FIG. 2*a*, the filter device 10 is shown in a side view wherein it can be seen that a cross-sectional area of the air conducting hose 2 tapers in flow direction, i.e., from the first end 21 to the second end 22, so that $A_1>A_2>A_3$ applies. This has the effect that in this way the flow through the individual filter elements 3 is made more uniform so that a dirt load is distributed uniformly onto all filter elements 3 and all have approximately the same service life. Moreover, such a configuration provides for material savings for the air conducting hose 2 because the surface area is smaller, for which reason the air conducting hose 2 can be produced more cost-efficiently.

Figure 2B:
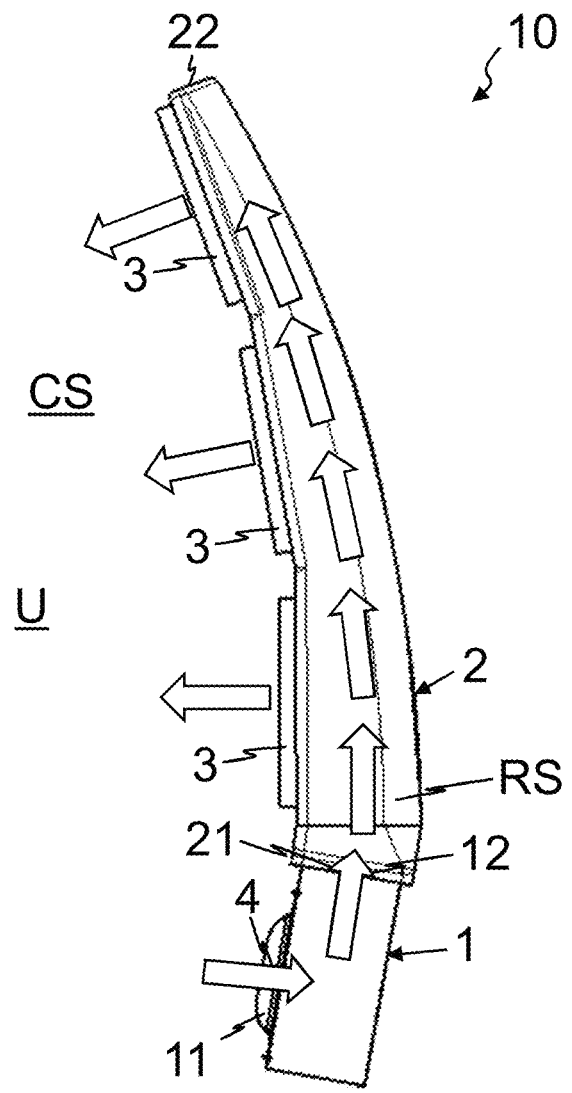
FIG. 2b shows a side view according to FIG. 2a with flow arrows.

A flow through the filter device 10 is illustrated schematically in FIG. 2*b*. The air flows from the environment U into the air inlet opening 11 of the blower housing 1, through the device 4 for generating the air flow, to the outlet opening 12 of the blower housing 1, and from there into the interior of the air guiding hose 2, where the raw side RS is present, before it is guided through the individual filter elements 3 to the clean side CS and thus back into the environment U.

The filter device 10 according to the invention is not only particularly flexible and adaptable easily to complex, in particular curved and/or otherwise ragged, installation spaces, but also permits a surprisingly clean servicing action (=exchange of the air conducting hose). In the servicing situation, the detachable attachment of the first open end 21 of the air conducting hose 2 is detached from the air outlet opening 12 or the air outlet socket of the blower housing 1 whereupon the air conducting hose 2 can be folded substantially like a bag, wherein separated particles that are located at the raw side are retained in the interior of the air conducting hose 2.

In the simplest case, the attachment of the air conducting hose 2 at the air outlet opening 12 or at the air outlet socket of the blower housing 1 can be realized by a hose clamp which surrounds the air outlet socket with compression of the air conducting hose 2. Alternatively, a detachable hose interface can be provided that comprises a first interface part at the blower housing and a second interface part at the first end of the air conducting hose 2. This is however not illustrated in the drawings.

Figure 3:
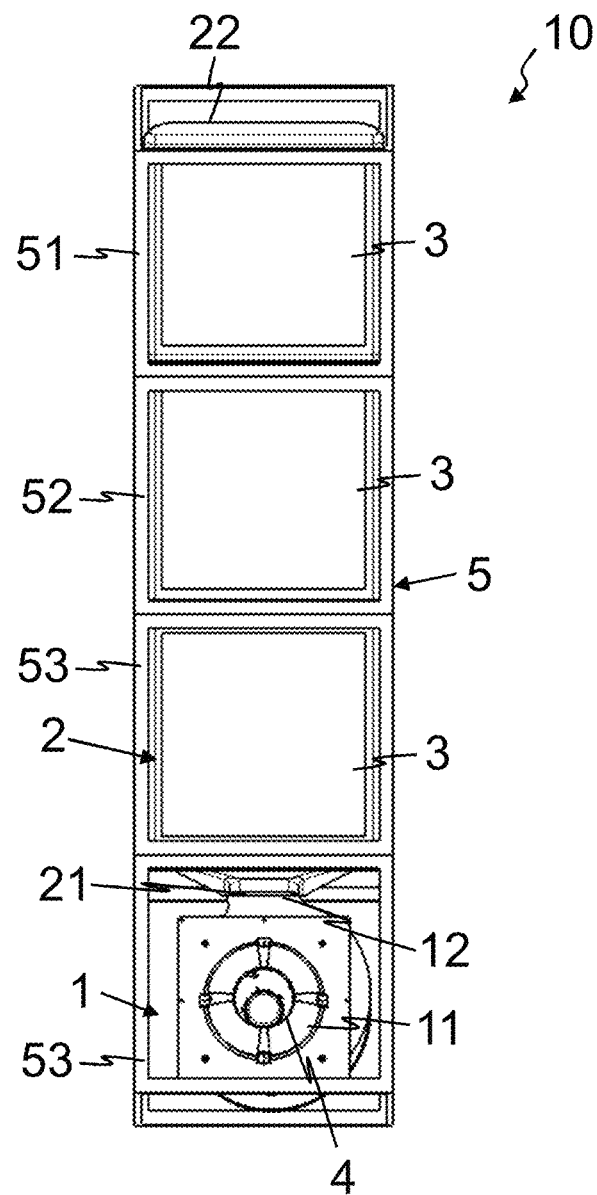
FIG. 3 shows a front view of the filter device according to the invention according to a second embodiment.
Figure 4:
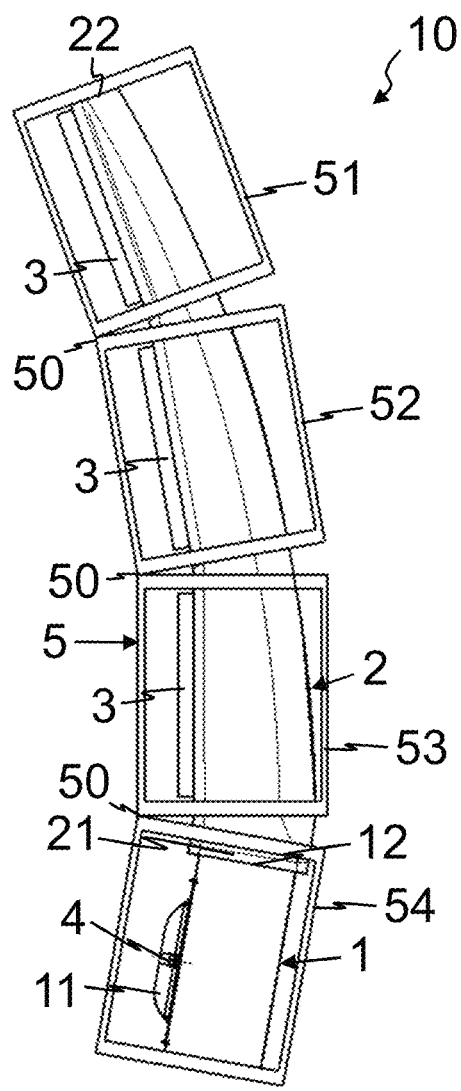
FIG. 4 shows a side view of the filter device according to the invention according to the second embodiment.

In FIG. 3, a filter device 10 according to a second embodiment is shown in a front view. Regarding the basic configuration, it corresponds to the first embodiment for which purpose only the differences will be explained here. In order to avoid the already described "collapse" of the air conducting hose 2 in the non-operative state of the blower 4, the filter device 10 is provided with a support device in the form of an outer support frame 5. The air conducting hose 2 is connected, at least in the region of its second end 22, to the outer support frame 5, for example, by means of a rope or wire. For attachment of the rope or wire at the air conducting hose 2, at least one reinforcement eye can be inserted into the material of the air conducting hose 2. Optionally, the air conducting hose 2 can be fastened also at additional locations to the outer frame support 5, which however is not illustrated in the drawing. The outer support frame 5 comprises four support segments 51-54 which each are formed as a parallelepipedal frame. The individual support device segments 51-54 are connected to each other respectively by at least one hinge or joint 50 which has a rotational degree of freedom. The individual support device segments 51-54 can therefore be tilted relative to each other which is illustrated in FIG. 4. The axes of rotation of the joints 50 are all parallel to each other here. In an embodiment not illustrated in the drawing, the axes of rotation of the joints 50 can however also be positioned at an angle to each other.

Such a tilting action of the support device segments 51-54 enables an adaptation of the filter device 10 to a curved installation space, for example, in a tunnel wall; the air conducting hose 2 adapts to any tilting action of the support device segments 51-54 because it is embodied in accordance with the invention from a flexible (film) material.

Figure 5:
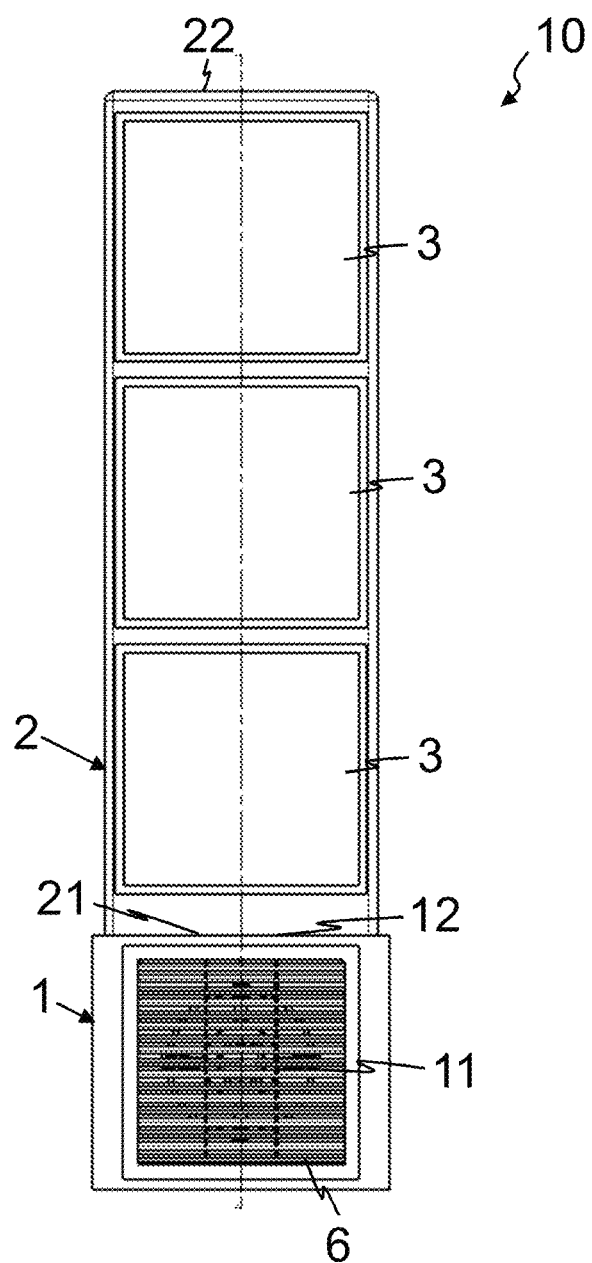
FIG. 5 shows a front view of the filter device according to the invention according to a third embodiment.
Figure 6:
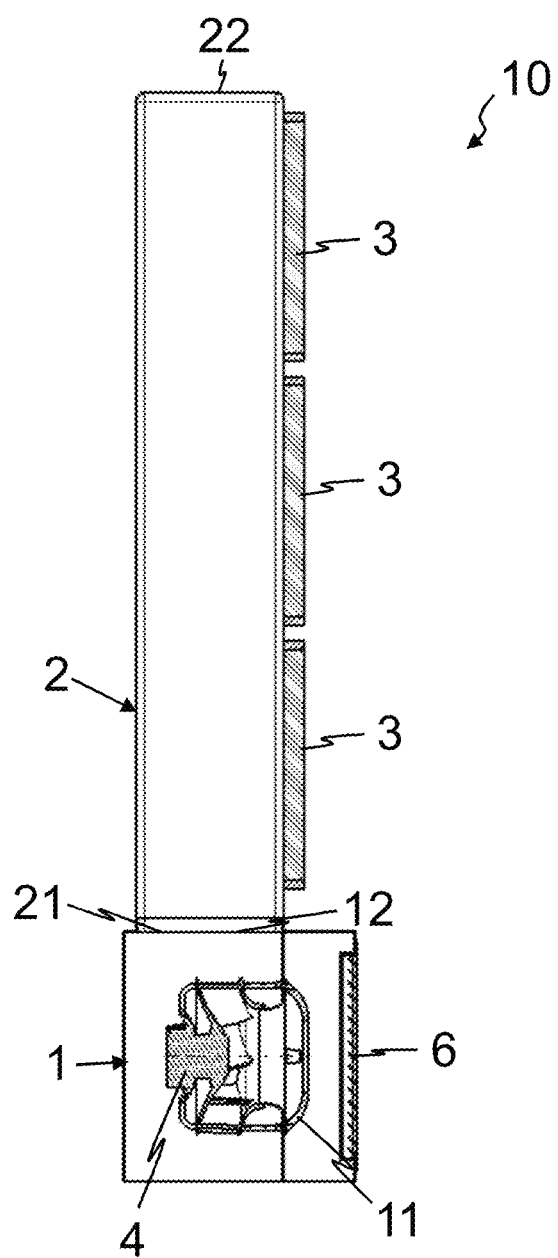
FIG. 6 shows a longitudinal section view of the filter device according to the invention according to the third embodiment.

In FIG. 5, a further (third) embodiment of the filter device 10 according to the invention is illustrated. It differs from the second embodiment by an air permeable grid 6 which covers the air inlet opening 11. The grid 6 prevents entry of foreign matter and limits, for safety aspects, access to the interior of the blower housing 1. FIG. 6 shows this third embodiment in a longitudinal section view.

Figure 7A:
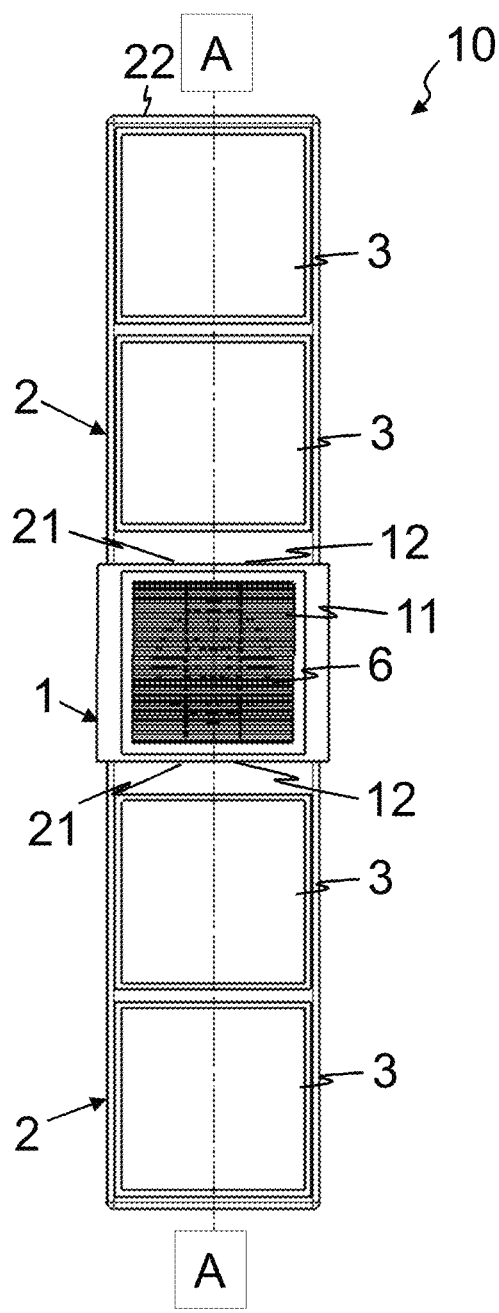
FIG. 7a shows a front view of the filter device according to the invention according to a fourth embodiment.
Figure 7B:
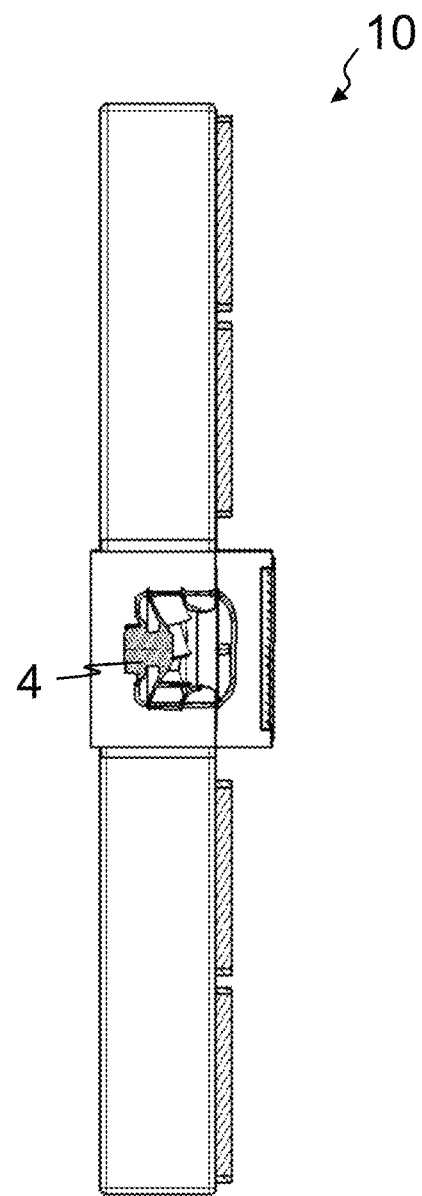
FIG. 7b shows a longitudinal section view of the filter device according to the invention according to the fourth embodiment.

FIG. 7*a* and FIG. 7*b* show a filter device 10 according to the invention according to a fourth embodiment. It differs from the herein afore described variants in that the blower housing 1 comprises two air outlet openings 12, each having connected thereto an air conducting hose 2. The two air outlet openings 12 are supplied with air originating from a common air inlet opening 11. The air outlet openings 12 are located at sides of the blower housing 1 which are facing away from each other. Of course, this embodiment can be combined arbitrarily with features of further embodiments; in this way, in particular also in regard to this embodiment, a support device (inside or outside) can be provided that supports the air conducting hose 2 in the non-operative state of the blower 4. The filter device 10 according to the fourth embodiment has the advantage that filtered air is provided bidirectionally. For example, the filter device 10 can be installed in a ceiling region of a tunnel with the blower housing 1 arranged at the ceiling of the tunnel, wherein the two air conducting hoses 2 can extend along the tunnel walls so that fresh air can be provided in a region where persons are present. In further embodiments not illustrated in the drawing, the filter device 10 can also comprise more than two air outlet openings 12 with more than two air conducting hoses 2 which can be present, for example, about a complete circumference of the blower housing 1.

In FIG. 8 and FIG. 9, the air conducting hose 2 according to the invention is illustrated with at least one filter element 3. According to FIG. 8, it comprises three openings 23 each provided with a filter element 3 and, according to FIG. 9, two openings 23 each provided with a filter element 3. At the first end 21, the air conducting hose 2 is of an open configuration for connection to the air outlet opening 12 of the blower housing 1 of the filter device 10 while the second end 22 is embodied closed. The cross section of the air conducting hose 2 can be polygonal, in particular rectangular, circular, elliptical, star-shaped or designed in other ways. Due to the flexible material of the air conducting hose 2, there are hardly any limits in regard to the variety of shapes. At the first end 21, in particular a second interface part can be present that provides for a fast coupling with the first interface part at the blower housing 1. The second interface part in this context can comprise at least one thread and/or bayonet connecting element and/or a predetermined keylock code so that mounting of filter elements that do not fit can be avoided.

Figure 10:
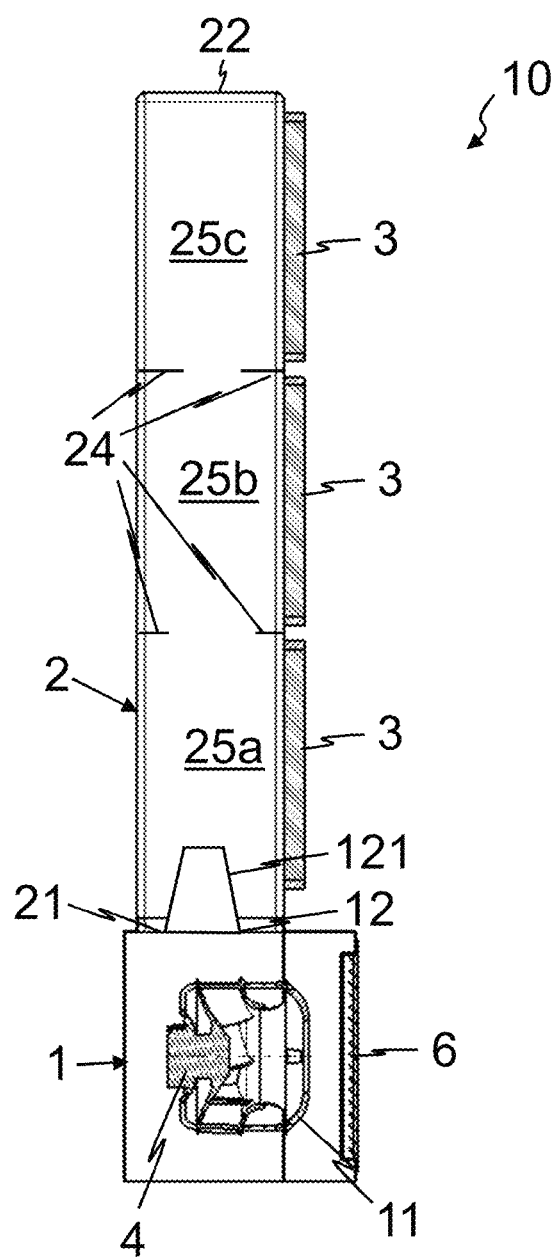
FIG. 10 shows a longitudinal section view of the filter device according to the invention according to a fifth embodiment.

Finally, in FIG. 10, a fifth embodiment is illustrated that corresponds in regard to its basic configuration to the third embodiment according to FIG. 6. However, at the air outlet opening 12 of the blower housing 1 an air conducting socket 121 is provided which extends partially axially into the interior of the air conducting hose 2. The air conducting socket 121 tapers in a direction facing away from the blower housing 1 (in flow direction) and thus provides for a flow focusing that prevents that a connecting region of the air conducting hose 2 in the region of its first end 21 will be overloaded by dynamic effects of the flow. Moreover, in the air conducting hose 2 various flow guiding structures 24 are provided which are formed preferably of the material of the air conducting hose 2 and project into the interior of the air conducting hose 2. The flow guiding structures 24 are designed as circumferentially extending intermediate walls but leave open a central flow cross section. Similar to a tapering course tapering in the axial direction, they serve for adaptation of the flow resistance in axial direction with the goal of achieving a more uniform flow through the filter elements 3. For this purpose, the flow guiding structures 24 project less far into the interior between the first and the second compartments 25a, 25b than the flow guiding structures 24 between the second and the third compartments 25b, 25c. Of course, the two measures (air conducting socket 121 and flow guiding structures 24) can also be used individually, not only in combination.

LIST OF REFERENCE CHARACTERS

1 blower housing
11 air inlet opening
12 air outlet opening
121 air conducting socket
2 air conducting hose
21 first open end
22 second closed end
23 opening of the air conducting hose
24 flow guiding structure
25a, 25b, 25c compartments of the air conducting hose
3 filter element
4 device for generating an air flow (blower)
10 filter device
$A_n$ local cross-sectional area of the air conducting hose
5 support device/exterior support frame
51-54 support device segments
50 joint/hinge
6 grid
CS clean side
RS raw side
U environment

What is claimed is:

1. A filter device for ambient air filtration, the filter device comprising:
a blower housing comprising an air inlet and an air outlet;
a device configured to generate an air flow arranged in the blower housing, wherein the device configured to generate an air flow generates an air flow from the air inlet to the air outlet in operation;
a flexible air conducting hose comprising a first open end configured to be connected to the air outlet of the blower housing and further comprising a second closed end;
wherein the flexible air conducting hose comprises one or more openings arranged between the first open end and the second closed end;
one or more filter elements, each filter element arranged in one of the openings, respectively, and separating a first side inside the flexible air conducting hose from a second side downstream of the filter element;
wherein the flexible air conducting hose is configured to be inflated by the air flow generated in operation of the device configured to generate an air flow;
wherein the flexible air conducting hose comprises a reduced air permeability in comparison to an air permeability of the filter elements, and
wherein the flexible air conducting hose comprises a flow guiding structure arranged in an interior of the flexible air conducting hose.

2. The filter device according to claim 1, wherein an inner cross-sectional area of the flexible air conducting hose decreases from the first open end toward the second closed end.

3. The filter device according to claim 1, wherein the one or more openings each comprise a rim region surrounding each opening, wherein the one or more filter elements are fluid-tightly connected to the rim region, respectively.

4. The filter device according to claim 3, wherein the one or more filter elements are fluid-tightly connected to the rim region by welding, gluing and/or sewing.

5. The filter device according to claim 1, wherein the flexible air conducting hose comprises two of the openings and two of the filter elements.

6. The filter device according to claim 1, wherein the flexible air conducting hose comprises three of the openings and three of the filter elements.

7. The filter device according to claim 1, wherein the flexible air conducting hose comprises a plurality of the openings, wherein the plurality of the openings are spaced apart from each other in a length direction of the flexible air conducting hose or the plurality of the openings are arranged oppositely positioned to each other.

8. The filter device according to claim 1, wherein the flexible air conducting hose comprises a plurality of the openings, wherein the plurality of the openings are spaced apart from each other in a length direction of the flexible air conducting hose and are arranged oppositely positioned to each other.

9. The filter device according to claim 1, further comprising a support device supporting the flexible air conducting hose at least partially along a length extension of the flexible air conducting hose.

10. The filter device according to claim 9, wherein the support device comprises an inner support frame extending inside of the flexible air conducting hose, wherein the inner support frame is connected to the blower housing at least in a region of the first open end of the flexible air conducting hose.

11. The filter device according to claim 9, wherein the support device comprises an outer support frame extending outside of the flexible air conducting hose, wherein the outer support frame surrounds the flexible air conducting hose.

12. The filter device according to claim 11, wherein the flexible air conducting hose is fastened at least with the second closed end to the outer support frame.

13. The filter device according to claim 12, wherein the flexible air conducting hose is fastened to the outer support frame by a rope or a wire.

14. The filter device according to claim 1, wherein the filter elements each comprise a polygonal shape and each comprise at least one folded bellows of a filter medium.

15. The filter device according to claim 14, wherein the filter medium comprises at least one adsorber selected from the group consisting of active carbon and zeolite.

16. The filter device according to claim 1, wherein the blower housing comprises two of said air outlet and two of said flexible air conducting hose, respectively, wherein the two air outlets are arranged at sides of the blower housing that are facing away from each other.

17. The filter device according to claim 1, wherein the air conducting hose is connected by a detachable hose interface to the air outlet of the blower housing.

18. The filter device according to claim 17, wherein the detachable hose interface comprises a first interface part arranged at the blower housing and a second interface part arranged at the first open end of the flexible air conducting hose.

19. The filter device according to claim 17, wherein the detachable hose interface comprises at least one thread and/or bayonet connecting element comprising a predetermined key-lock code.

20. The filter device according to claim 1, wherein the flow guiding structure is comprised of a single-layer or multilayer fabric and/or film material.

21. The filter device according to claim 1, wherein the flow guiding structure forms at least two compartments in the interior of the flexible air conducting hose and the at least two compartments are at least partially closed off relative to each other.

22. A tunnel comprising a tunnel floor, a tunnel ceiling, and at least one tunnel wall, wherein the tunnel wall has a curved cross section shape, wherein at or in the at least one curved tunnel wall a filter device according to claim 1 is arranged.

23. A method of filtering ambient air in a tunnel, the method comprising:
arranging a filter device according to claim 1 in the tunnel and passing the ambient air through the filter device.

24. An air conducting hose for a filter device, the air conducting hose comprising:
a first open end configured to be connected to an air outlet of a blower housing of the filter device and further comprising a second closed end;
one or more openings arranged between the first open end and the second closed end;
one or more filter elements, each filter element arranged in one of the openings, respectively, and separating a first side inside the air conducting hose from a second side downstream of the filter element; and
wherein the air conducting hose is flexible and comprises a reduced air permeability in comparison to an air permeability of the filter elements; and
wherein the flexible air conducting hose comprises a flow guiding structure arranged in an interior of the flexible air conducting hose.

25. The air conducting hose according to claim 24, further comprising an interface part of a hose interface at the first open end.

26. The air conducting hose according to claim 25, wherein the interface part comprises at least one thread and/or bayonet connecting element comprising a predetermined lock-key code.

* * * * *